W. N. TIENCKEN.
BRACE.
APPLICATION FILED FEB. 23, 1921.
1,395,876.
Patented Nov. 1, 1921.
3 SHEETS—SHEET 1.
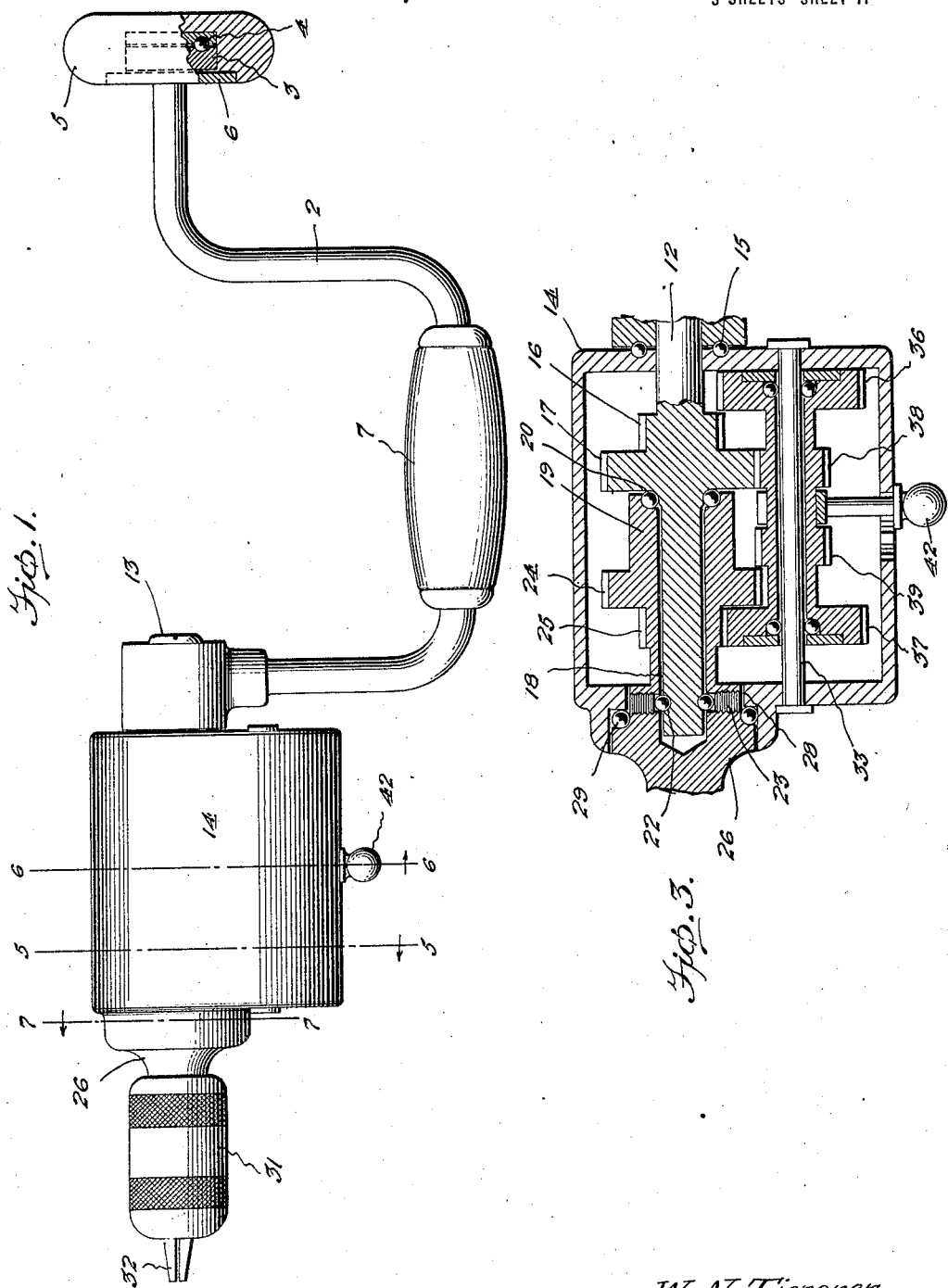

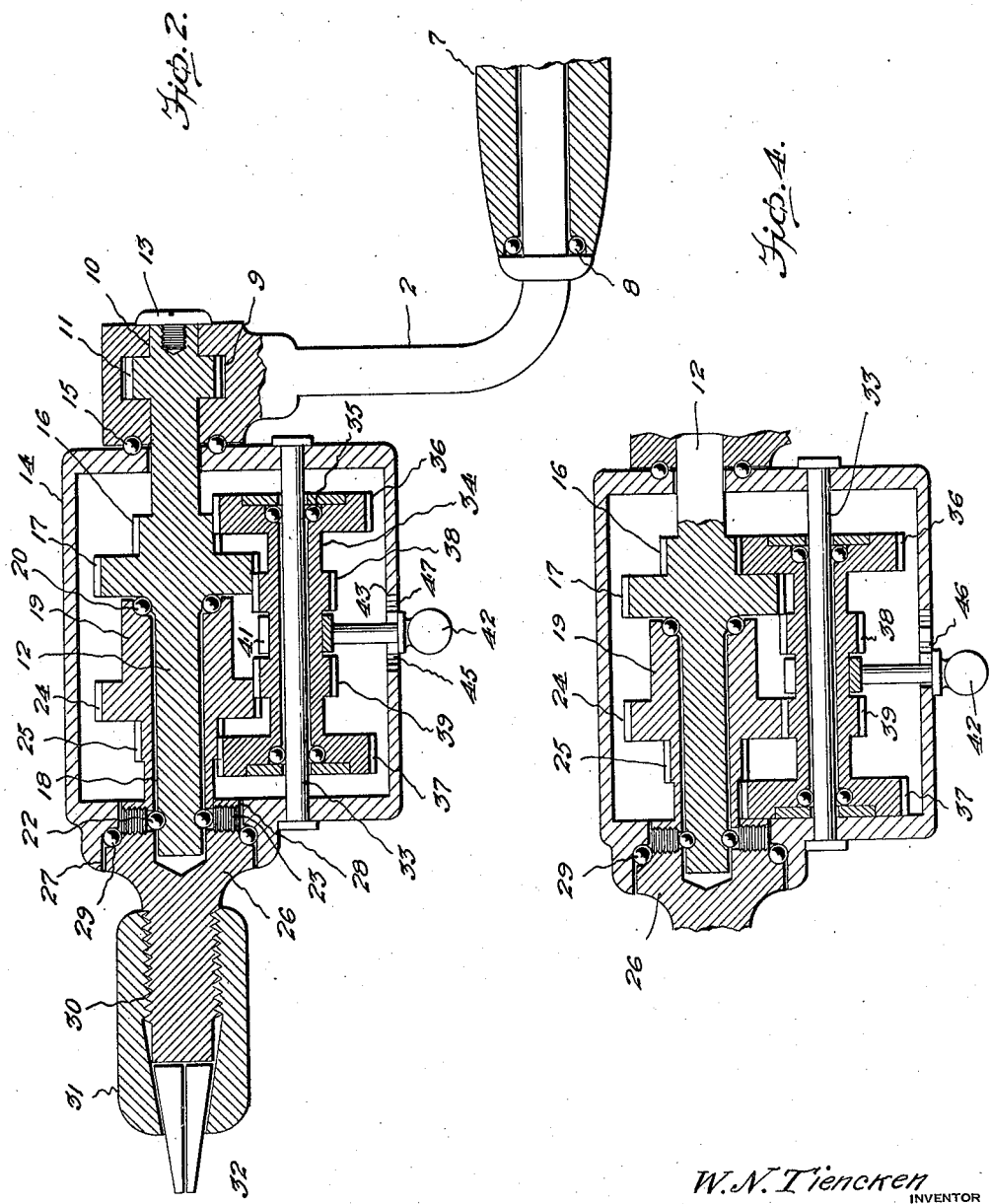

W. N. TIENCKEN.
BRACE.
APPLICATION FILED FEB. 23, 1921.
1,395,876.
Patented Nov. 1, 1921.
3 SHEETS—SHEET 3.
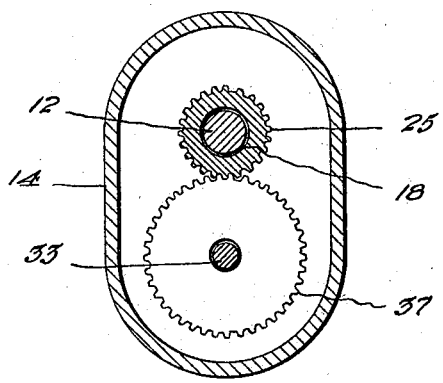
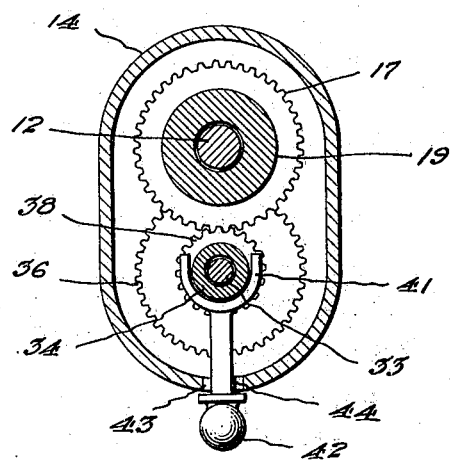
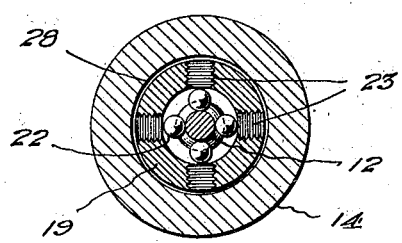
W. N. Tiencken INVENTOR
BY Victor J. Evans ATTORNEY
WITNESS:

UNITED STATES PATENT OFFICE.

WILLIAM N. TIENCKEN, OF SAVANNAH, GEORGIA.

BRACE.

1,395,876. Specification of Letters Patent. Patented Nov. 1, 1921.

Application filed February 23, 1921. Serial No. 447,193.

*To all whom it may concern:*

Be it known that I, WILLIAM N. TIENCKEN, a citizen of the United States, residing at Savannah, in the county of Chatham and State of Georgia, have invented new and useful Improvements in Braces, of which the following is a specification.

My present invention has reference to improvements in sweep braces for use by carpenters or other mechanics.

My object is to produce a brace having means for revolving the bit carrying chuck at varying speeds with respect to the revolution of the sweep.

A further object is to produce a brace drill of this character in which the changes of speed between the revolving of the sweep and the revolving of the chuck may be accurately determined and readily regulated.

A still further object is to produce a variable speed brace, or drill whose construction shall be simple, which may be manufactured at a comparatively small cost, in which the parts constituting the improvement thereof are removable and interchangeable, and which will perform the functions for which it is intended accurately and with certainty.

The foregoing, and other objects which will appear as the nature of the invention is better understood, may be accomplished by a construction, combination and operative arrangement of parts, such as is disclosed by the drawings which accompany and which form part of this application.

In the drawings:—

Figure 1 is an elevation of a brace constructed in accordance with this invention.

Fig. 2 is a similar view with parts broken away and parts in section, and also showing the arrangement of the mechanism whereby the chuck and the spindle operated by the sweep will turn at the same speed.

Fig. 3 is a similar view but showing the arrangement of parts whereby the chuck will be turned more rapidly than the spindle, the ratio being 4 to 1.

Fig. 4 is a similar view in which the speed of travel of the chuck is reduced with respect to the speed of travel of the spindle, the ratio being 1 to 4.

Fig. 5 is a sectional view approximately on the line 5—5 of Fig. 1.

Fig. 6 is a sectional view approximately on the line 6—6 of Fig. 1.

Fig. 7 is a sectional view approximately on the line 7—7 of Fig. 1.

The improved brace is broadly indicated by the numeral 1, the same having its sweep 2 provided at its outer end with a straight extension that terminates in a rounded head 3. This head on its outer face has an annular raceway for anti-frictional rollers 4, that are received in a similar raceway in a plate that is let in with the head in the breast plate 5. The numeral 6 designates the plate for securing the head and anti-frictional rollers in the breast plate. The sweep 2 has its central crank portion provided with the usual handle 7, and between the ends of the handle and flanges formed on the sweep are anti-frictional rollers 8. The straight inner arm of the sweep is enlarged, and may be constructed in two parts, an annular pocket 9 being formed therein, and a transverse round opening 10 passes through the pocket. In the pocket there is the rounded flanged or head portion 11 of a spindle 12. The end of the spindle that is received through the opening has a threaded bore which is engaged by the threaded shank of a headed screw 13, the head of the screw contacting with the outer face of the arm of the sweep.

The spindle 12 enters an opening in a substantially elliptical casing 14. The face of the casing next to the sweep is closed, anti-frictional bearings 15 being seated in suitable raceways between the said face of the casing and the sweep. The outer face of the casing has an opening therethrough in a line with the spindle.

The spindle, on the portion thereof received in the casing is integrally formed with a toothed wheel 16 which has its inner face contacting with a larger toothed wheel 17, the latter being also integrally formed on the spindle. Beyond the toothed wheel 17 the spindle is extended a desired distance, being received centrally in the referred to opening in the outer end of the casing. For distinction this extending end of the spindle is indicated by the numeral 18, and the same forms a bearing for the hollow or inner end portion of a longitudinally arranged member which, in reality, provides a second spindle, or rather an extension for the spindle 12. This member will therefore be hereinafter referred to as the outer spindle section. The outer spindle section has its hollow portion indicated by the numeral 19, and abuts against the straight outer face of the enlargement on which the toothed wheel 17 is formed. There are, however, raceways between the ends of the outer spindle and the face of the said wheel, in which are arranged anti-frictional rollers 20. In addition to this, the extension 18 of the inner spindle 12 is provided, adjacent to its outer end with an annular depression forming a raceway for anti-frictional balls 22, the hollow portion 19 of the outer spindle having its bore provided with an annular depression receiving said balls 20. This last mentioned depression has threaded openings communicating therewith, the said openings being closed by threaded plugs 23. The hollow portion 19 of the outer spindle, at a suitable distance away from its inner end has integrally formed thereon a toothed wheel 24 of a diameter corresponding to the toothed wheel 17, and the said hollow portion of the outer spindle just beyond the toothed wheel 24 has an integrally formed second toothed wheel 25, the diameter of which being equal to the diameter of the toothed wheel 16 on the inner spindle section.

The outer spindle has an annular enlarged portion 26 that is received in a depression 27 that surrounds the referred to open portion of the casing. This opening is indicated by the numeral 28. Between the shoulder provided by the enlargement 26 and the shoulder provided at the inner wall of the depression 27 there is a raceway for anti-frictional balls 29. The portion of the outer spindle casing is threaded, in the usual manner, as indicated by the numeral 30 to receive thereon the chuck sleeve 31, the same designed to brace the chuck jaws 32 to hold a bit or similar tool therebetween.

Journaled in suitable bearing openings in the ends of the casing 14, and disposed in a plane parallel to the longitudinally extending inner and outer spindle members, there is a shaft 33. On this shaft there is journaled for both rotary and longitudinal movement an enlongated sleeve 34. Between the sleeve and shaft there are anti-frictional bearings 35. On both ends of the sleeve there are integrally formed annular enlargements that have peripheral teeth that provide toothed wheels 36 and 37 respectively. Also on the sleeve, inward of the respective toothed wheels 36, and 37, there is integrally formed a pair of spaced toothed wheels 38 and 39 respectively. The diameter of the wheels 36 and 37 is greatly in excess to that of the wheels 38 and 39; the wheels 36 and 37 being arranged for meshing with the wheels 25 and 16 on the respective outer and inner spindle sections, while the wheels 38 and 39 are designed for meshing engagement with the wheels 24 and 17 on the said outer and inner spindle sections, in accordance with the longitudinal movement of the sleeve 34 on the shaft 33. Between the wheels 38 and 39 the spindle 34 is provided with an annular depression in which is received the yoked end 41 of an operating element 42. This element 42 has a handle portion that passes through an elongated slot 43 in the casing 14, and spring means 44 may be employed for forcing the handle 42 into one of three spaced notches 45, 46 or 47 that are formed in one of the side walls provided by the opening or slot 43.

When the handle of the operating member is manipulated so that the same is received in the notch 46, the parts are arranged as disclosed in Fig. 2 of the drawings. When so arranged, it will be noted that the wheel 36 is in mesh with the wheel 16, the wheel 38 is in mesh with the wheel 17, the wheel 39 is in mesh with the wheel 24, and the wheel 37 is in mesh with the wheel 25. Thus when the sweep is revolved, motion from the inner spindle member will be imparted to the wheels 36 and 38 on the sleeve 34, and motion to the outer spindle member will be imparted by the wheels 39 and 37 to the wheels 24 and 25 of the outer spindle member. Thus the outer spindle will revolve at the same rate of speed as the inner spindle and will, of course, turn in unison with the sleeve.

When the parts are arranged as disclosed in Fig. 3 of the drawings, that is when the handle 42 of the operating member is brought into the slot 47, the sleeve 34 is moved longitudinally on the shaft 33 to bring the wheel 36 out of mesh with the wheel 16 of the inner spindle, while the wheel 38 of the said sleeve is in mesh with the large wheel 17 on the inner spindle member. The small toothed wheel 39 of the sleeve is out of mesh with the large toothed wheel 24 on the outer spindle member, while the large wheel 37 of the sleeve is in mesh with the small toothed wheel 25 on the said outer spindle member. Thus, when the sweep is revolved the outer spindle will turn at a greater rapidity than the inner spindle and the sweep, the ratio being, in the present instance, approximately 4 to 1.

When the parts are arranged as disclosed in Fig. 4 of the drawings, and when the handle of the operating member is brought into the notch 35 the large toothed wheel 36 of the sleeve is in mesh with the small toothed wheel 16 of the inner spindle member, while the small toothed wheel 38 of the sleeve is out of mesh with the large toothed wheel 17 on the said inner spindle member or section. The next small toothed wheel 39 of the sleeve is in mesh with the large toothed wheel 24 on the outer spindle member or section, while the second large toothed wheel 37 of the sleeve is out of mesh with the small toothed wheel 25 on the outer spindle member. Thus the sweep and inner spindle member will impart a comparatively slow rotary movement to the sleeve, which, through the intermeshing of its wheel 39 with the large wheel 24 of the outer spindle will cause the latter to revolve more slowly than the turning of the inner spindle member and the sleeve, the ratio being approximately 1 to 4.

It is to be understood that the spindle section on the sweep, the wheels on the chuck carrying spindle section and the wheels on the sleeve are not necessarily toothed, but may have a frictional engagement with each other, and also, in lieu of providing the said wheels with straight engaging surfaces, such contacting surfaces may be beveled.

It is believed that the foregoing description, when taken in connection with the drawings will fully set forth the construction and advantages of the improvement to those skilled in the art to which such inventions relate without further detailed description, it being understood that the nature of the invention is such as to render the same susceptible to changes and modifications all of which, however, falling within the scope of what is claimed.

It is, of course, to be understood that the casing is held from turning by one hand of the operator when the device is in operation.

Having described the invention, I claim:—

1. In a breast drill, a spindle section on the sweep thereof having different peripheral diameters, a hollow chuck carrying spindle section having different cross sectional diameters and received on the first mentioned section and slidable and revoluble means between the sections having different peripheral diameters designed when adjusted to coengage with the different diameters of both of the chuck sections whereby the same receives motion from the first mentioned chuck section when the sweep is revolved and imparts such motion to the chuck carrying spindle section, and also whereby the speed of the chuck carrying section may be varied with respect to the speed of the first mentioned chuck section.

2. In a breast drill, a spindle section connected to and revoluble with the sweep of the drill, said spindle section having peripheral wheels of different diameters, a second hollow chuck carrying spindle section arranged on the first mentioned section, anti-frictional bearing means between the sections, said chuck carrying section having peripheral wheels of different diameters, a sleeve journaled for slidable and rotary movement adjacent to and in parallelism with the spindle section, said sleeve having peripheral wheels of different diameters, means for moving the sleeve longitudinally to bring certain of the wheels thereof into frictional engagement with certain of the wheels on the respective spindle sections, whereby the sleeve will be revolved by the turning of the first mentioned spindle section with the sweep and impart varying speed revolutions to the chuck carrying spindle section.

3. In a breast drill, a spindle section connected to and revoluble with the sweep of the drill, said spindle section having peripheral wheels of different diameters, a second hollow chuck carrying spindle section arranged on the first mentioned section, anti-frictional bearing means between the sections, said chuck carrying section having peripheral wheels of different diameters, a sleeve journaled for slidable and rotary movement adjacent to and in parallelism with the spindle sections, said sleeve having peripheral wheels of different diameters, means for moving the sleeve longitudinally to bring certain of the wheels thereof into frictional engagement with certain of the wheels on the respective spindle sections, whereby the sleeve will be revolved by the turning of the first mentioned spindle section with the sweep and impart varying speed revolutions to the chuck carrying spindle section, a casing inclosing the wheeled portions of the spindles and the sleeve, and anti-frictional means between the sleeve, sweep and chuck.

In testimony whereof I affix my signature.

WILLIAM N. TIENCKEN.